(12) United States Patent
Lee et al.

(10) Patent No.: US 10,126,580 B2
(45) Date of Patent: Nov. 13, 2018

(54) LIQUID CRYSTAL DISPLAY DEVICE

(71) Applicant: LG Display Co., Ltd., Seoul (KR)

(72) Inventors: Hyeonuk Lee, Gyeongsangbuk-do (KR); SangHun So, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/213,704

(22) Filed: Jul. 19, 2016

(65) Prior Publication Data

US 2017/0031202 A1    Feb. 2, 2017

(30) Foreign Application Priority Data

Jul. 29, 2015  (KR) ........................ 10-2015-0107206

(51) Int. Cl.
*G02F 1/1333* (2006.01)
*B32B 7/14* (2006.01)
(Continued)

(52) U.S. Cl.
CPC .......... *G02F 1/133308* (2013.01); *B32B 7/00* (2013.01); *B32B 7/14* (2013.01); *B32B 27/06* (2013.01); *B32B 27/20* (2013.01); *G02F 1/133512* (2013.01); *B29C 65/48* (2013.01); *B29C 65/4835* (2013.01);
(Continued)

(58) Field of Classification Search
CPC ............. G02F 1/133308; G02F 1/1333; G02F 1/1335; G02F 1/13338; G02F 1/133512; G02F 1/133615; G02F 1/133528; G02F 1/133509; G02F 1/1339; G02F 1/136209; G02F 1/1336; G02F 1/133524; G02F 2001/133317; G02F 2001/133314; G02F 2001/133331; G02F 2001/133562; G02F 2001/13332; G02F 2001/133325; G02F 2001/133311; G02F 2001/133308; G02F 2001/1351; G02F 2201/46; G02F 2201/503; G02F 2202/28; G02B 6/0088; G06F 1/16; G06F 1/1601; G06F 1/1607; G06F 1/1656; H04N 5/64; B32B 2457/202; B32B 2457/20
USPC ......... 349/65, 58, 122, 62, 61, 110, 153, 96; 362/606, 97.1, 615, 97.2, 633, 634, 97.3; 348/836
See application file for complete search history.

(56) References Cited

U.S. PATENT DOCUMENTS 9,086,586 B2    7/2015 Ha et al.
9,261,633 B2*   2/2016 Inoue ..................... C08K 3/28
(Continued)

OTHER PUBLICATIONS

Extended European Search Report dated Nov. 2, 2016 for corresponding European Patent Application No. 16180338.2.

*Primary Examiner* — Thoi Duong
(74) *Attorney, Agent, or Firm* — Morgan, Lewis & Bockius LLP

(57) ABSTRACT

A liquid crystal display device is provided. The liquid crystal display device includes a liquid crystal display panel; a backlight unit; a cover glass; a frame; and a filling member. The backlight unit is in contact with a bottom surface of the liquid crystal display panel. The cover glass is bonded to a top surface of the liquid crystal display panel. The frame is bonded to the cover glass. The filling member is configured to bond a lateral surface of the frame, a lateral surface of the liquid crystal display panel and a lateral surface of the backlight unit and reduce a leaked light emitted from the backlight unit.

19 Claims, 4 Drawing Sheets

(51) Int. Cl.
*B32B 27/20* (2006.01)
*G02F 1/1335* (2006.01)
*B32B 7/00* (2006.01)
*B32B 27/06* (2006.01)
*B29C 65/48* (2006.01)

(52) U.S. Cl.
CPC ...... *B29C 65/4845* (2013.01); *B29C 65/4875* (2013.01); *B32B 2307/20* (2013.01); *B32B 2307/40* (2013.01); *B32B 2457/00* (2013.01); *B32B 2457/20* (2013.01); *B32B 2457/202* (2013.01); *G02F 2001/133314* (2013.01); *G02F 2001/133317* (2013.01); *G02F 2001/133322* (2013.01); *G02F 2001/133325* (2013.01); *G02F 2001/133331* (2013.01); *G02F 2201/46* (2013.01); *G02F 2201/503* (2013.01); *G02F 2202/023* (2013.01); *G02F 2202/28* (2013.01)

(56) References Cited

U.S. PATENT DOCUMENTS

| | | | |
|---|---|---|---|
| 9,690,328 B2 * | 6/2017 | Trutna | G02F 1/133308 |
| 2013/0242226 A1 * | 9/2013 | Jeong | G06F 1/1637 |
| | | | 349/58 |
| 2013/0342970 A1 * | 12/2013 | Franklin | G06F 1/1643 |
| | | | 361/679.01 |
| 2014/0192272 A1 | 7/2014 | Kang | |

* cited by examiner

LIQUID CRYSTAL DISPLAY DEVICE

CROSS-REFERENCE TO RELATED APPLICATIONS

This application claims the priority of Korean Patent Application No. 10-2015-0107206 filed on Jul. 29, 2015, in the Korean Intellectual Property Office, the disclosure of which is incorporated herein by reference.

BACKGROUND

Field

The present disclosure relates to a liquid crystal display device, and more particularly, to a liquid crystal display device with minimized light leakage that may occur between a liquid crystal display panel and a backlight unit.

Description of the Related Art

A liquid crystal display (LCD) device is a display device for displaying an image by adjusting the transmissivity of light generated from a light source. In the LCD device, the light source is disposed under a liquid crystal and an electric field is applied to the liquid crystal to control alignment of the liquid crystal. The LCD device is applied to various electronic devices such as a smartphone, a tablet PC, etc. Particularly, in recent years, studies for reducing a bezel area of the LCD device are being actively conducted to achieve a beautiful design of the LCD device and reduce a size of the LCD device.

A typical LCD device includes a backlight unit including a light source and a liquid crystal display panel disposed on the backlight unit. The backlight unit and the liquid crystal display panel are bonded to each other by an adhesive tape. However, as a bezel area of the LCD device is reduced, a size of the adhesive tape is also reduced. Therefore, an adhesive area of the adhesive tape may also be reduced. The reduction in adhesive area of the adhesive tape causes various problems such as a decrease in adhesion of the adhesive tape and occurrence of a light leakage from the LCD device.

FIG. 1 is a cross-sectional view provided to explain a cause of occurrence of a light leakage from an LCD device. Referring to FIG. 1, an LCD device 100 includes a liquid crystal display panel 110, a backlight unit 120, a cover glass 150 that covers the liquid crystal display panel 110, a frame 160 surrounding an edge of the cover glass 150, and an adhesive member 165 that bonds the frame 160 to the cover glass 150.

A light generated from a light source in the backlight unit 120 is incident into a lower polarizing plate 111 of the liquid crystal display panel 110 through a light guide plate 121 and an optical sheet 123. The light incident into the lower polarizing plate 111 penetrates a liquid crystal 113 disposed between a lower substrate 112 and an upper substrate 114 of the liquid crystal display panel 110 to be incident into an upper polarizing plate 115 and emitted to an active area A/A of the cover glass 150.

The backlight unit 120 and the liquid crystal display panel 110 are bonded to each other by an adhesive tape 142. In this case, a space is formed between the backlight unit 120 and the liquid crystal display panel 110 due to a thickness of the adhesive tape 142. Most of the light emitted through the optical sheet 123 of the backlight unit 120 is incident into the lower polarizing plate 111 of the liquid crystal display panel 110. However, some of the light may be leaked through the space between the backlight unit 120 and the liquid crystal display panel 110. In this case, the adhesive tape 142 has a light shielding property in order to absorb the leaked light.

However, as the active area A/A is increased and a bezel area B/A is reduced, an area for the adhesive tape 142 may be reduced. Particularly, the adhesive tape 142 has a light shielding property and thus cannot be disposed in the active area A/A but can be disposed only in the bezel area B/A. Therefore, if the bezel area B/A is reduced, a width of the adhesive tape 142 is reduced. However, as the width of the adhesive tape 142 is reduced, an adhesive area of the adhesive tape 142 is reduced. Therefore, adhesion of the adhesive tape 142 may be reduced. If a width of the bezel area B/A is 1 mm or less, adhesion of the adhesive tape 142 is greatly reduced. Therefore, the liquid crystal display panel 110 and the backlight unit 120 may be separated. Thus, a light may be easily leaked through a separated region between the liquid crystal display panel 110 and the backlight unit 120. Further, as the width of the adhesive tape 142 is reduced, a light shielding property of the adhesive tape 142 is also reduced. Therefore, the adhesive tape 142 may not sufficiently suppress a light leakage.

A light leaked between the liquid crystal display panel 110 and the backlight unit 120 may be emitted to the bezel area B/A of the cover glass 150, and the light can be slightly seen from the outside. Therefore, an additional light shielding film may be attached to a bottom surface of the cover glass 150 in order to suppress occurrence of a light leakage from the bezel area B/A of the cover glass 150. However, even if the light shielding film reduces a light leakage to a certain degree, a light leakage may slightly occur between the cover glass 150 and an outer case of the LCD device 100 in contact with a lateral surface of the cover glass 150. For example, the outer case of the LCD device 100 may be disposed to be in contact with the lateral surface of the cover glass 150 without covering a top surface of the cover glass 150 in order to achieve a beautiful design of the LCD device 100. In this case, a micro space may be formed between the outer case and the lateral surface of the cover glass 150 due to a process error. A light leaked between the liquid crystal display panel 110 and the backlight unit 120 may be seen through the micro space between the cover glass 150 and the outer case.

Further, recently, the outer case of the LCD device 100 has various colors, and the LCD device 100 including a bright color outer case can be manufactured. Particularly, for uniformity in design of the LCD device 100, an edge of the cover glass 150 in the LCD device 100 including a bright color outer case may be formed to have the same bright color as the outer case. Therefore, the light shielding film attached to the bottom surface of the cover glass 150 needs to have a bright color. Further, since the frame 160 disposed under the cover glass 150 can be seen from the outside through the cover glass 150, the frame 160 needs to have a bright color or needs to be transparent. When the light shielding film and the frame 160 have a bright color, the light shielding property is reduced. Therefore, a light leaked between the liquid crystal display panel 110 and the backlight unit 120 may penetrate the frame 160 and the light shielding film each having the reduced light shielding property and may be slightly seen from the outside.

Meanwhile, as the bezel area B/A is reduced, a width of the frame 160 is also reduced. If the width of the frame 160 is reduced, an adhesive area between the frame 160 and the cover glass 150 is also reduced. Therefore, adhesion between the frame 160 and the cover glass 150 may be reduced, and, thus, the frame 160 and the cover glass 150 may be separated. In order to suppress such separation, the adhesive member 165 for reinforcing the adhesion between the frame 160 and the cover glass 150 may be used. The adhesive member 165 may be formed by bonding the cover glass 150 to the liquid crystal display panel 110 and then coating an adhesive on an edge where a lateral surface of the frame 160 is connected to the bottom surface of the cover glass 150. However, as the bezel area B/A is reduced, a physical space to be coated with the adhesive is reduced. Thus, it may be difficult to bond the frame 160 to the cover glass 150 using the adhesive member 165. Further, since the adhesive area of the adhesive member 165 is reduced, the adhesion between the frame 160 and the cover glass 150 may be reduced. Thus, durability of the frame 160 may be reduced and durability of the LCD device 100 may also be reduced.

SUMMARY

Accordingly, the present invention is directed to a liquid crystal display device that substantially obviates one or more of the problems due to limitations and disadvantages of the related art The inventors of the present disclosure recognized that as a bezel area is reduced, adhesion of an adhesive tape for bonding a liquid crystal display panel to a backlight unit may be reduced and a light shielding property may be reduced. Further, the inventors of the present disclosure recognized that as a bezel area is reduced, adhesion of an adhesive member for reinforcing adhesion between a frame and a cover glass is reduced, and, thus, durability of the frame may be reduced. Accordingly, the inventors of the present disclosure invented a liquid crystal display device with a filling member configured to bond a frame, a liquid crystal display panel, and a backlight unit and shield a light emitted from the backlight unit. In the liquid crystal display device, a light leakage is reduced and durability of the frame is improved.

An object of the present disclosure is to provide a liquid crystal display device in which a lateral surface of a liquid crystal display panel and a lateral surface of a backlight unit are bonded by a filling member to minimize a space between the liquid crystal display panel and the backlight unit. Further, in the liquid crystal display device, the filling member having a light shielding property absorbs a light emitted from the backlight unit, and, thus, a light leakage is minimized.

Another object to be achieved by the present disclosure is to provide a liquid crystal display device in which a filling member configured to fill a space between a frame and a liquid crystal display panel and a space between the frame and a backlight unit tightly fixes the frame, and, thus, durability of the frame is improved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a liquid crystal display panel; a backlight unit; a cover glass; a frame; and a filling member. The backlight unit is in direct contact with a bottom surface of the liquid crystal display panel. The cover glass is bonded to a top surface of the liquid crystal display panel. The frame is bonded to the cover glass. The filling member is configured to bond a lateral surface of the frame, a lateral surface of the liquid crystal display panel and a lateral surface of the backlight unit. The filling member is configured to reduce a leaked light emitted from the backlight unit.

In another aspect, a liquid crystal display device comprises a liquid crystal display module; a cover glass; and a multifunctional member. The liquid crystal display module includes a liquid crystal display panel and a backlight unit. The cover glass covers an upper part of the liquid crystal display module. A frame is bonded to the cover glass as being separated from a lateral surface of the liquid crystal display module. The multifunctional member is configured to fill a space between the frame and the liquid crystal display module and minimize a light leaked from a space between the backlight unit and the frame.

According to the present disclosure, a liquid crystal display panel and a backlight unit are bonded to each other using a filling member, and, thus, a separate adhesive tape may be omitted. Accordingly, a space between the liquid crystal display panel and the backlight unit can be minimized, and, thus, a light leaked between the liquid crystal display panel and a backlight unit can be minimized.

According to the present disclosure, a filling member configured to fill a space between a frame and a liquid crystal display panel and a space between the frame and a backlight unit tightly bonds the frame, the liquid crystal display panel, and the backlight unit. Therefore, durability of the frame in a liquid crystal display device can be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
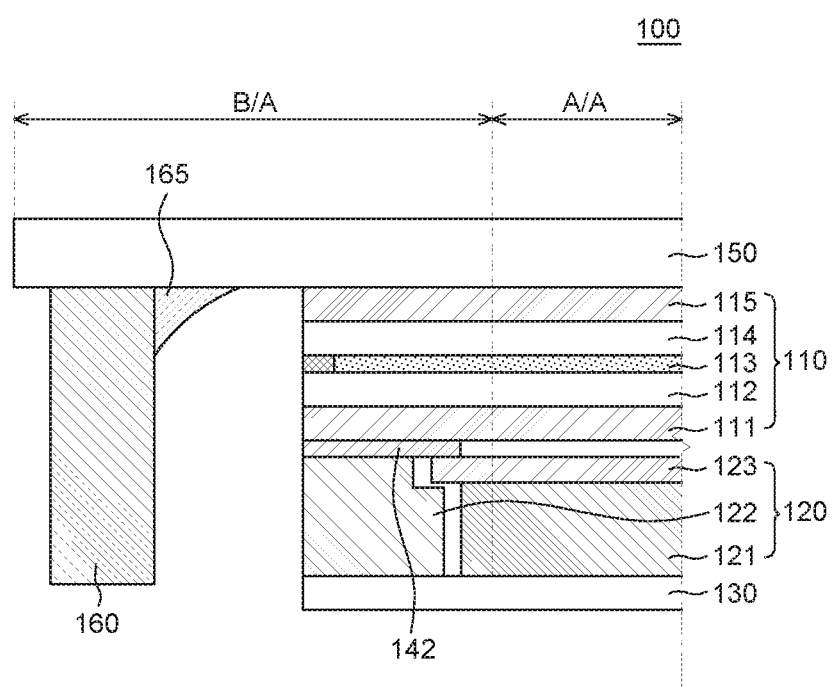
FIG. 1 is a cross-sectional view provided to describe a cause of occurrence of a light leakage from an LCD device.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to the accompanying drawings.

Figure 2:
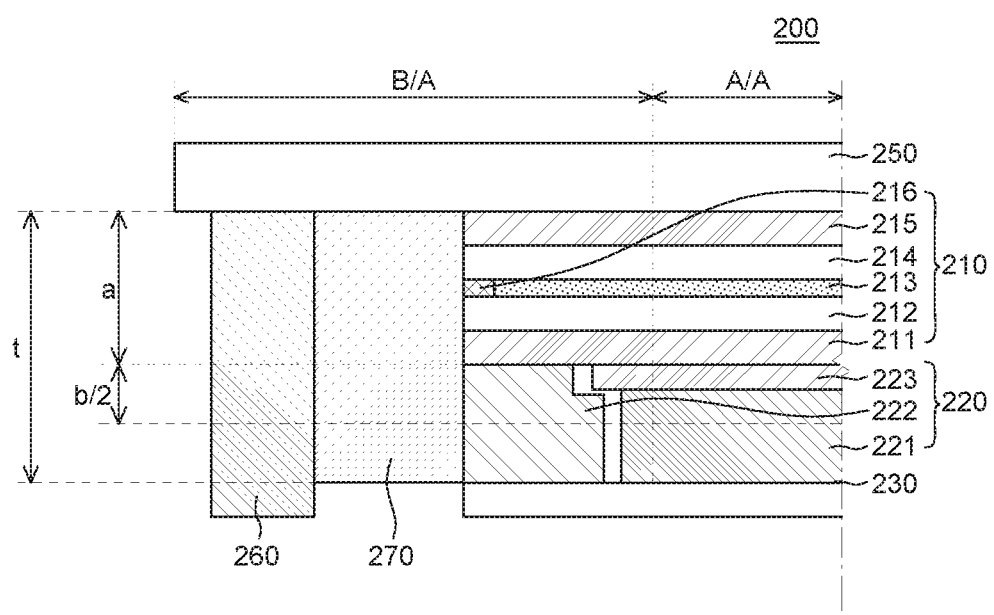
FIG. 2 is a cross-sectional view provided to explain a liquid crystal display device according to an exemplary embodiment of the present disclosure.

FIG. 2 is a cross-sectional view provided to explain a liquid crystal display device according to an exemplary embodiment of the present disclosure. Referring to FIG. 2, a liquid crystal display (LCD) device 200 includes a liquid crystal display panel 210, a backlight unit 220, a cover glass 250, a frame 260, and a filling member 270. For convenience in explanation, FIG. 2 illustrates only one side cross-sectional view of the LCD device 200 and illustrates thicknesses of the respective components of the LCD device 200.

Referring to FIG. 2, the liquid crystal display panel 210 includes a lower polarizing plate 211, a lower substrate 212, a liquid crystal 213, an upper substrate 214, a sealant 216, and an upper polarizing plate 215. The liquid crystal display panel 210 displays an image by adjusting the transmissivity of a light emitted from the backlight unit 220.

The lower polarizing plate 211 and the upper polarizing plate 215 are configured to polarize a light. For example, the lower polarizing plate 211 polarizes a light emitted from the backlight unit 220 and then supplies the polarized light to the lower substrate 212. The upper polarizing plate 215 polarizes a light penetrating the upper substrate 214 and then emits the polarized light to an upper part of the cover glass 250.

The lower substrate 212 is configured to support various components of the liquid crystal display panel 210. On the lower substrate 212, a thin film transistor (TFT), a pixel electrode electrically connected to the TFT, and a common electrode facing the pixel electrode are disposed. Thus, the lower substrate 212 may be referred to as a TFT substrate. The TFT generates an electric field between the pixel electrode and the common electrode on the basis of a driving signal transferred through a line.

The upper substrate 214 is disposed to face the lower substrate 212. The upper substrate 214 is configured to support a color filter layer, and may be referred to as a color filter substrate. The color filter layer selectively transmits a light having a specific wavelength. A full color image is displayed through the color filter layer.

The sealant 216 seals the upper substrate 214 and the lower substrate 212. The sealant 216 suppresses infiltration of moisture or a foreign material into the liquid crystal 213, the TFT, the pixel electrode, and the common electrode disposed between the upper substrate 214 and the lower substrate 212.

The liquid crystal 213 is disposed between the upper substrate 214 and the lower substrate 212. The liquid crystal 213 is aligned in a uniform direction. The alignment of the liquid crystal 213 may be changed on the basis of an electric field between the pixel electrode and the common electrode. By changing the alignment of the liquid crystal 213, the transmissivity of a light emitted from the backlight unit 220 can be controlled. A light penetrating the liquid crystal 213 is emitted to an active area A/A of the cover glass 250.

The backlight unit 220 emits a light to the liquid crystal display panel 210. The backlight unit 220 includes a light source, a light guide plate 221, a mold frame 222, and an optical sheet 223.

The light source generates a light, and includes a light emission diode (LED) and a driver circuit that drives the LED, but is not limited thereto. The light source may include a cold cathode fluorescent lamp (CCFL) or an external electrode fluorescent lamp instead of the LED. The light source is not illustrated in FIG. 2, but a direct-type or edge-type light source may be disposed to generate a light.

The mold frame 222 is disposed to surround the light guide plate 221 and constitutes a side wall of the backlight unit 220. That is, the light source, the light guide plate 221, and the optical sheet 223 may be disposed inside the mold frame 222. In some exemplary embodiments, the mold frame 222 may be omitted.

The light guide plate 221 diffuses or collects a light emitted from the light source and guides the light to the lower polarizing plate 211 of the liquid crystal display panel 210. The light guide plate 221 may have a flat panel shape as illustrated in FIG. 2 or may have a wedge shape.

The optical sheet 223 is disposed on the light guide plate 221, and improves the luminance of a light from the light source. FIG. 2 illustrates the optical sheet 223 as a single film, but the optical sheet 223 may include a plurality of sheets including a diffusion sheet and a prism sheet.

A supporting panel 230 is configured to support components of the backlight unit 220. The mold frame 222 and the light guide plate 221 of the backlight unit 220 may be bonded to the supporting panel 230 by an adhesive tape.

The liquid crystal display panel 210 and the backlight unit 220 are components for displaying an image on the LCD device 200. The backlight unit 220 and the liquid crystal display panel 210 may be referred to as a liquid crystal module (LCM). The backlight unit 220 is in direct contact with a bottom surface of the liquid crystal display panel 210. That is, the mold frame 222 and the optical sheet 223 of the backlight unit 220 are in direct contact with a bottom surface of the lower polarizing plate 211 of the liquid crystal display panel 210. Therefore, a space is not formed between the liquid crystal display panel 210 and the backlight unit 220.

The cover glass 250 is configured to cover the liquid crystal display panel 210 and the backlight unit 220 and protect components of the liquid crystal display panel 210 and the backlight unit 220 from an external impact, a foreign material, or moisture. For example, the cover glass 250 may be formed of glass having an excellent stiffness or plastic which is thermally formable and has an excellent formability. The cover glass 250 includes an active area A/A and a bezel area B/A surrounding the active area A/A. The TFT, the pixel electrode, and the common electrode are disposed in a region on the lower substrate 212 corresponding to the active area A/A. The TFT generates an electric field between the pixel electrode and the common electrode so as to control alignment of the liquid crystal. Therefore, the transmissivity of a light incident into the active area A/A from the backlight unit 220 is controlled. Accordingly, an image is displayed on the active area A/A of the cover glass 250.

The frame 260 is bonded to a bottom surface of the cover glass 250 and surrounds the liquid crystal display panel 210 and the backlight unit 220. For example, the frame 260 is disposed to surround an edge of the cover glass 250, and the liquid crystal display panel 210 and the backlight unit 220 are disposed inside the frame 260. As illustrated in FIG. 2, a lateral surface of the frame 260 is separated from a lateral surface of the liquid crystal display panel 210 and a lateral surface of the backlight unit 220 facing the lateral surface of the frame 260.

The filling member 270 fills a space between the lateral surface of the frame 260 and the lateral surface of the liquid crystal display panel 210 and a space between the lateral surface of the frame 260 and the lateral surface of the backlight unit 220. The filling member 270 bonds the frame 260, the liquid crystal display panel 210, and the backlight unit 220. That is, as illustrated in FIG. 2, the filling member 270 is in contact with the bottom surface of the cover glass 250, the lateral surface of the frame 260, the lateral surface of the liquid crystal display panel 210, and the lateral surface of the backlight unit 220. The filling member 270 bonds the lateral surface of the frame 260, the lateral surface of the liquid crystal display panel 210, and the lateral surface of the backlight unit 220 each other.

The liquid crystal display panel 210 and the backlight unit 220 are bonded to each other by the filling member 270 instead of a separate adhesive tape. That is, as described above, a separate adhesive tape or adhesive member is not disposed between the bottom surface of the liquid crystal display panel 210 and a top surface of the backlight unit 220. The liquid crystal display panel 210 and the backlight unit 220 are bonded by the filling member 270 in direct contact with the lateral surface of the liquid crystal display panel 210 and the lateral surface of the backlight unit 220 without any adhesive tape or member intervened between the liquid crystal display panel 210 and the backlight unit 220.

The filling member 270 has a predetermined thickness t. The thickness t of the filling member 270 may be equal to or greater than a sum of a thickness a of the liquid crystal display panel 210 and half of a thickness b/2 of the backlight unit 220. As described above, the frame 260 is bonded to the liquid crystal display panel 210 and the backlight unit 220 by the filling member 270. In order for the filling member 270 to maintain a sufficient adhesion, it is necessary to secure a sufficient contact area of the filling member 270. Therefore, the filling member 270 is in contact with the frame 260, the liquid crystal display panel 210 and the backlight unit 220 as large as possible. That is, the filling member 270 is in contact with the lateral surface of the liquid crystal display panel 210 and more than half of the lateral surface of the backlight unit 220. If the filling member 270 is in contact with less than half of the lateral surface of the backlight unit 220, a sufficient adhesive area of the filling member 270 may not be secured or the liquid crystal display panel 210 and the backlight unit 220 may be separated.

The filling member 270 is formed of a resin composition. For example, the filling member 270 may be formed of a photo-curable resin composition which is cured by ultraviolet or infrared light, but is not limited thereto. The filling member 270 may be formed of a heat-curable resin composition or naturally curable resin composition. If the filling member 270 is formed of an ultraviolet-curable resin composition which is cured by ultraviolet light, the ultraviolet-curable resin composition may contain an acrylate monomer, an acrylate oligomer, a photoinitiator for initiating a polymerization reaction between the acrylate monomer and the acrylate oligomer based on ultraviolet light, and an additive. The additive is a material for increasing adhesion of the ultraviolet-curable resin composition, and may employ a silane-based compound. The filling member 270 may be formed of a polymer formed by curing a resin composition.

Further, the resin composition constituting the filling member 270 may further contain carbon black. The carbon black may be contained in an amount of at least 1 wt % with respect to the total weight of the resin composition. For example, the carbon black may be contained in an amount of 1 wt % to 99 wt % with respect to the total weight of the resin composition. The filling member 270 has a light shielding property due to the carbon black. As an amount of the carbon black is increased, the light shielding property of the filling member 270 can be improved.

The filling member 270 absorbs a light emitted from the backlight unit 220 so as to minimize a leakage of the light to other regions than the active area A/A. That is, since the filling member 270 is formed of the resin composition containing the carbon black, the filling member 270 can effectively suppress a leakage of the light emitted from the backlight unit 220 to the outside. To be specific, most of the light emitted from the backlight unit 220 is transferred to the liquid crystal display panel 210 through the light guide plate 221 and the optical sheet 223. However, some of the light may be leaked through a space between the backlight unit 220 and the liquid crystal display panel 210. Particularly, if the top surface of the backlight unit 220 and the bottom surface of the liquid crystal display panel 210 are bonded to each other by a separate adhesive tape, the backlight unit 220 and the liquid crystal display panel 210 may be slightly separated from each other due to a thickness of the adhesive tape. Further, a light emitted from the backlight unit 220 may be leaked through the separation space. Particularly, if the backlight unit 220 and the liquid crystal display panel 210 are separated from each other, a light can be easily leaked through a separated region. The light leaked between the backlight unit 220 and the liquid crystal display panel 210 may penetrate an edge of the cover glass 250 and may be seen from the outside. To be specific, an outer case of the LCD device 200 may be disposed to surround the edge of the cover glass 250. In this case, the outer case may be disposed to be in contact with an edge lateral surface of the cover glass 250 without covering a top surface of the cover glass 250 in order to achieve a beautiful design of the LCD device 200. However, a micro space may be formed between the outer case and the lateral surface of the cover glass 250 due to a process error. A light leaked between the backlight unit 220 and the liquid crystal display panel 210 may be leaked through the space between the lateral surface of the cover glass 250 and the outer case.

Further, if the outer case has a bright color, an edge of the LCD device 200 may be formed to have a bright color for uniformity in design. In this case, the frame 260 may be formed to have a bright color or may be formed to be transparent. A light leaked between the backlight unit 220 and the liquid crystal display panel 210 penetrates the frame 260 and is more easily leaked through a space between the lateral surface of the cover glass 250 and the outer case.

However, the liquid crystal display panel 210 of the LCD device 200 according to an exemplary embodiment of the present disclosure is in direct contact with the backlight unit 220. Further, a separate adhesive tape is not disposed between the liquid crystal display panel 210 and the backlight unit 220. Thus, a space is not formed between the liquid crystal display panel 210 and the backlight unit 220. There is a low possibility of a light leakage through the space between the liquid crystal display panel 210 and the backlight unit 220. Further, the filling member 270 for filling the space between the frame 260 and the liquid crystal display panel 210 and the space between the frame 260 and the backlight unit 220 has a light shielding property. Thus, even if a light is leaked between the liquid crystal display panel 210 and the backlight unit 220, the filling member 270 absorbs the leaked light and thus effectively suppresses a light leakage.

Meanwhile, the filling member 270 is formed of a curable resin composition and tightly bonds the frame 260, the liquid crystal panel 210, and the backlight unit 220 each other. To be specific, the filling member 270 bonds the lateral surface of the liquid crystal panel 210 to the lateral surface of the backlight unit 220 each other. If the liquid crystal panel 210 is bonded to the backlight unit 220 by a separate adhesive tape, the adhesive tape needs to have a sufficient adhesive area to bond the liquid crystal panel 210 to the backlight unit 220. However, if the bezel area B/A of the LCD device 200 is reduced, an area for the adhesive tape is reduced. That is, the adhesive tape may be disposed in a region corresponding to the bezel area B/A so as not to shield a light emitted from the backlight unit 220. If the bezel area B/A is reduced, the area for the adhesive tape is reduced and a width of the adhesive tape is reduced. In this case, the adhesive tape does not have a sufficient adhesive area, and, thus, the liquid crystal panel 210 and the backlight unit 220 may not be tightly bonded to each other. However, the filling member 270 of the LCD device 200 according to an exemplary embodiment of the present disclosure bonds the lateral surface 210 of the liquid crystal display panel 210 to the lateral surface of the backlight unit 220. Therefore, even if the bezel area B/A is reduced, the liquid crystal panel 210 and the backlight unit 220 may be stably bonded to each other.

Further, the filling member 270 may reinforce durability of the frame 260. To be specific, as the bezel area B/A of the LCD device 200 is reduced, a size of the cover glass 250 may be reduced and a size of the frame 260 may also be reduced. If the size of the frame 260 is reduced, the durability of the frame 260 may be reduced. However, the filling member 270 of the LCD device 200 according to an exemplary embodiment of the present disclosure fills the space between the frame 260 and the liquid crystal display panel 210 and the space between the frame 260 and the backlight unit 220. Therefore, the filling member 270 may absorb a part of an impact applied to the frame 260 and minimize deformation of the frame 260. Accordingly, the durability of the frame 260 can be improved.

As a result, the filling member 270 absorbs a light which may be leaked between the liquid crystal display panel 210 and the backlight unit 220, bonds the liquid crystal display panel 210 to the backlight unit 220, and improves the durability of the frame 260. That is, the filling member 270 is multifunctional in the LCD device 200. Accordingly, the filling member 270 may be referred to as a multifunctional member.

The following [Table 1] shows evaluation data provided to explain advantages of the LCD device 200 according to an exemplary embodiment of the present disclosure.

TABLE 1

| Kind of Evaluation | Comparative Example | Example |
|---|---|---|
| Evaluation on Light Leakage | 50% | 99.67% |
| Evaluation on Adhesion | 6.07 N | 14.7 N |
| Evaluation on Frame Stiffness | 0.29 mm | 0.12 mm |

Referring to [Table 1], the LCD device 200 according to an exemplary embodiment of the present disclosure has the advantages of a reduced light leakage, an improved adhesion between the liquid crystal display panel 210 and the backlight unit 220, and an improved durability of the frame 260.

In [Table 1], Example means the LCD device 200 according to an exemplary embodiment of the present disclosure, and Comparative Example means a conventional LDC device in which the filling member 270 is omitted. That is, the LCD device according to Comparative Example includes a liquid crystal display panel and a back light unit bonded to each other by a separate adhesive tape, but does not include a filling member. However, the LCD device 200 according to an exemplary embodiment of the present disclosure includes the liquid crystal display panel 210 and the backlight unit 220 bonded to each other by the filling member 270. Further, in the LCD device 200 according to an exemplary embodiment of the present disclosure, a separate adhesive tape is omitted, and, thus the liquid crystal display panel 210 is in direct contact with the backlight unit 220. A result value of each evaluation item in [Table 1] is an average value of result values obtained by evaluating five LCD devices according to Comparative Example and five LCD devices 200 according to an exemplary embodiment of the present disclosure.

First, referring to Evaluation on Light Leakage in [Table 1], it can be seen that a light leakage shielding ratio of the LCD device 200 according to an exemplary embodiment of the present disclosure is remarkably improved as compared with the LCD device according to Comparative Example. Herein, the light leakage shielding ratio was calculated by driving each of the LCD devices according to Comparative Example and the LCD devices 200 according to an exemplary embodiment of the present disclosure to display a black screen in a darkroom at an illuminance of less than 5 Lux and measuring the intensity of a light leaked through an edge of each LCD device. As a result of measuring the light leakage shielding ratio, the average shielding ratio average of the LCD devices according to Comparative Example was 50%. Further, the average shielding ratio of the LCD devices 200 according to an exemplary embodiment of the present disclosure was 99.67%. Therefore, it can be seen that the filling member 270 of the LCD device 200 according to an exemplary embodiment of the present disclosure minimizes a light leakage occurring between the liquid crystal display panel 210 and the backlight unit 220.

Further, referring to Evaluation on Adhesion in [Table 1], it can be seen that the liquid crystal display panel 210 and the backlight unit 220 in the LCD device 200 according to an exemplary embodiment of the present disclosure are tightly bonded to each other as compared with the liquid crystal display panel and the backlight unit in the LCD device according to Comparative Example. The evaluation on adhesion was conducted by pulling a liquid crystal display panel and a backlight unit bonded to each other in different directions and measuring a tensile force when the liquid crystal display panel and the backlight unit are separated from each other. As a result of the evaluation on adhesion, when the average tensile force of 6.07 N was applied, the liquid crystal display panels and the backlight units of the respective LCD devices according to Comparative Example are separated. Further, when the average tensile force of 14.7 N was applied, the liquid crystal display panels 210 and the backlight units 220 of the respective LCD devices 200 according to an exemplary embodiment of the present disclosure are separated. Therefore, it can be seen that the filling member 270 of the LCD device 200 according to an exemplary embodiment of the present disclosure tightly bonds the liquid crystal display panel 210 and the backlight unit 220 to each other.

Furthermore, referring to Evaluation on Frame Stiffness in [Table 1], it can be seen that the frame 260 of the LCD device 200 according to an exemplary embodiment of the present disclosure has an improved durability as compared with the frame of the LCD device according to Comparative Example. The evaluation on frame stiffness was conducted by measuring a displacement of a frame when the frame was pushed by a force of 50 N. As a result of the evaluation on frame stiffness, the frames of the LCD devices according to Comparative Example had the average displacement of 0.29 mm. Further, the frames 260 of the LCD devices 200 according to an exemplary embodiment of the present disclosure had the average displacement of 0.12 mm. Therefore, it can be seen that the filling member 270 of the LCD device 200 according to an exemplary embodiment of the present disclosure sufficiently improves durability of the frame 260.

As described above, the LCD device 200 according to an exemplary embodiment of the present disclosure includes the filling member 270. The filling member 270 is configured to bond the frame 260, the liquid crystal display panel 210, and the backlight unit 220 and shield a light emitted from the backlight unit 220. That is, the filling member 270 bonds the liquid crystal display panel 210 and the backlight unit 220 to each other. Thus, the liquid crystal display panel 210 and the backlight unit 220 can be bonded to each other without a separate adhesive tape. The liquid crystal display panel 210 and the backlight unit 220 can be in direct contact with each other. Therefore, a space is not formed between the liquid crystal display panel 210 and the backlight unit 220. The possibility of a light leakage through the space between the liquid crystal display panel 210 and the backlight unit 220 may be reduced. Further, the filling member 270 is formed of the resin composition containing carbon black. Therefore, the filling member 270 has a light shielding property. Accordingly, even if a light is leaked between the liquid crystal display panel 210 and the backlight unit 220, most of the light may be absorbed by the filling member 270. Thus, a light leakage from the LCD device 200 may be remarkably reduced. Meanwhile, the filling member 270 fills the space between the frame 260 and the liquid crystal display panel 210 and the space between the frame 260 and the backlight unit 220. Thus, the filling member 270 may absorb a part of an impact applied to the frame 260. Accordingly, the durability of the frame 260 can be improved.

Figure 3:
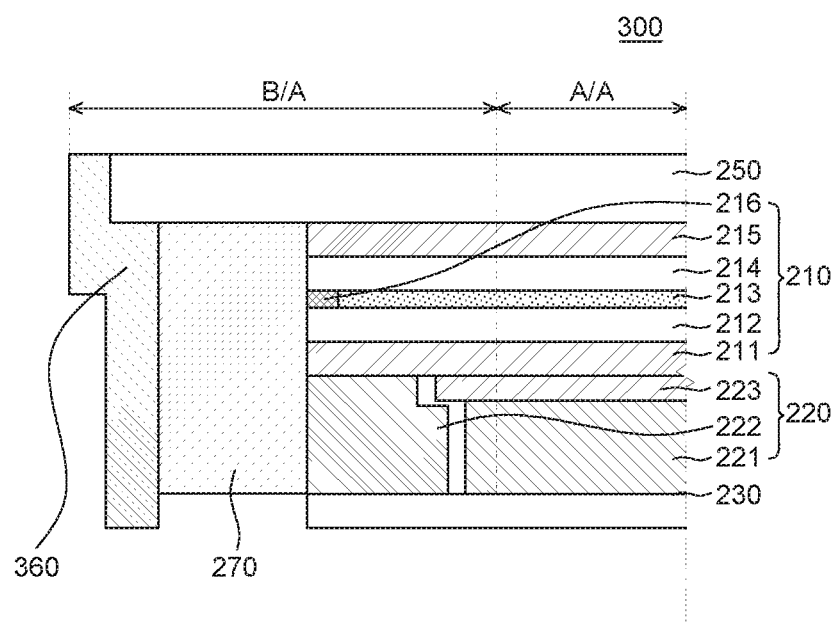
FIG. 3 is a cross-sectional view provided to explain a liquid crystal display device according to another exemplary embodiment of the present disclosure.

FIG. 3 is a cross-sectional view provided to explain a liquid crystal display device according to another exemplary embodiment of the present disclosure. A liquid crystal display (LCD) device 300 illustrated in FIG. 3 is the same as the LCD device 200 illustrated in FIG. 2 except that the LCD device 300 includes a frame 360 extended from the bottom surface of the cover glass 250 to the lateral surface of the cover glass 250. Therefore, the redundant description thereof will be omitted.

Referring to FIG. 3, the frame 360 is bonded to both of the bottom surface and the lateral surface of the cover glass 250. For example, the frame 360 is disposed to surround an edge of the cover glass 250 and bonded to the bottom surface and the lateral surface of the cover glass 250 at the edge of the cover glass 250. In this case, an adhesive area between the frame 360 and the cover glass 250 is increased. Thus, the frame 360 and the cover glass 250 are more stably bonded to each other. Therefore, a width of the frame 360 may be reduced. As described above, in order to reduce a bezel area B/A of the LCD device 300, an area of the cover glass 250 needs to be reduced. However, if the area of the cover glass 250 is reduced, the width of the frame 360 needs to be decreased. Therefore, the adhesive area between the cover glass 250 and the frame 360 may be reduced. In this case, since the adhesive area between the frame 360 and the cover glass 250 is reduced, the frame 360 and the cover glass 250 may be separated from each other. However, the LCD device 300 according to another exemplary embodiment of the present disclosure includes the frame 360 bonded to the cover glass 250 at the bottom surface and the lateral surface of the cover glass 250. Therefore, even if the width of the frame 360 is reduced, the frame 360 can be stably bonded to the cover glass 250 at the lateral surface and the bottom surface of the cover glass 250 and the bezel area B/A can be reduced.

Figure 4:
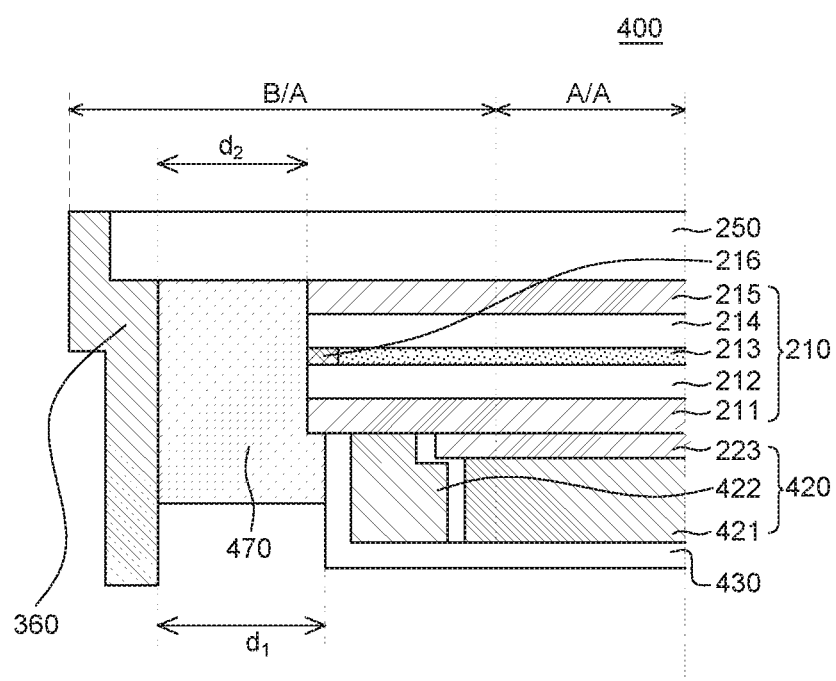
FIG. 4 is a cross-sectional view provided to explain a liquid crystal display device according to yet another exemplary embodiment of the present disclosure.

FIG. 4 is a cross-sectional view provided to explain a liquid crystal display device according to yet another exemplary embodiment of the present disclosure. A liquid crystal display (LCD) device 400 illustrated in FIG. 4 is the same as the LCD device 300 illustrated in FIG. 3 except that the LCD device 400 includes a supporting panel 430 extended to surround a lateral surface of a mold frame 422 of a backlight unit 420. Therefore, the redundant description thereof will be omitted.

Referring to FIG. 4, the supporting panel 430 of the backlight unit 420 is bonded to a bottom surface of the mold frame 422 and a bottom surface of a light guide plate 421 and configured to support components of the backlight unit 420. Particularly, the supporting panel 430 is extended from the bottom surface of the mold frame 422 to the lateral surface of the mold frame 422. Thus, the supporting panel 430, the mold frame 422, and the optical sheet 223 of the backlight unit 420 are surrounded by the supporting panel 430. That is, the supporting panel 430 accommodates the backlight unit 420. Therefore, the backlight unit 420 may be modularized by the supporting panel 430.

The supporting panel 430 is disposed inside the liquid crystal display panel 210. That is, the supporting panel 430 is in contact with the bottom surface of the lower polarizing plate 211 of the liquid crystal display panel 210. In this case, a distance $d_1$ from the lateral surface of the frame 360 to a lateral surface of the supporting panel 430 may be greater than a distance $d_2$ from the lateral surface of the frame 360 to the lateral surface of the liquid crystal display panel 210.

The LCD device 400 according to yet another exemplary embodiment of the present disclosure includes the supporting panel 430 in contact with the bottom surface of the liquid crystal display panel 210. Further, the backlight unit 420 is accommodated in the supporting panel 430. Therefore, the liquid crystal display panel 210 and the backlight unit 420 can be more tightly bonded to each other. That is, since the supporting panel 430 is disposed inside the liquid crystal display panel 210, a filling member 470 may have a greater adhesive area with respect to the liquid crystal display panel 210 and the supporting panel 430. Therefore, the liquid crystal display panel 210 may be more tightly bonded to the backlight unit 420 accommodated in the supporting panel 430.

Further, if the supporting panel 430 has a light shielding property, even when a light is leaked between the liquid crystal display panel 210 and the backlight unit 420, the leaked light may be primarily absorbed by the supporting panel 430. Even if some of the light penetrates the supporting panel 430, the light penetrating the supporting panel 430 may be secondarily absorbed by the filling member 470. Accordingly, a light leakage from the LCD device 400 can be further reduced.

Meanwhile, the distance $d_1$ from the lateral surface of the frame 360 to the lateral surface of the supporting panel 430 is greater than the distance $d_2$ from the lateral surface of the frame 360 to the lateral surface of the liquid crystal display panel 210. Thus, a process for forming the filling member 470 may be more easily performed. To be specific, as a bezel area B/A is reduced, a space between the frame 360 and the liquid crystal display panel 210 may be reduced. If the supporting panel 430 is not disposed inside the liquid crystal display panel 210, a space between the frame 360 and the supporting panel 430 may be reduced as the space between the frame 360 and the liquid crystal display panel 210 is reduced. In this case, a space through which the resin composition for forming the filling member 470 is introduced may be reduced, and the filling member 470 may not be formed well. However, the supporting panel 430 of the LCD device 400 according to yet another exemplary embodiment of the present disclosure is disposed inside the liquid crystal display panel 210. That is, the space between the frame 360 and the liquid crystal display panel 210 (i.e., the distance $d_2$ from the lateral surface of the frame 360 to the lateral surface of the liquid crystal display panel 210) is reduced. However, the space between the frame 360 and the supporting panel 430 (i.e., the distance $d_1$ from the lateral surface of the frame 360 to the lateral surface of the supporting panel 430) can be sufficiently secured. Accordingly, a physical space through which the resin composition for forming the filling member 470 is introduced can be secured, and the filling member 470 can be stably formed.

The exemplary embodiments of the present disclosure can also be described as follows:

According to an aspect of the present disclosure, there is provided a liquid crystal display device including: a liquid crystal display panel; a backlight unit; a cover glass; a frame; and a filling member. The backlight unit is in direct contact with a bottom surface of the liquid crystal display panel. The cover glass is bonded to a top surface of the liquid crystal display panel. The frame is bonded to the cover glass. The filling member is configured to bond a lateral surface of the frame, a lateral surface of the liquid crystal display panel and a lateral surface of the backlight unit. The filling member is configured to reduce a leaked light emitted from the backlight unit.

According to another feature of the present disclosure, the frame is in contact with a bottom surface of the cover glass at an edge of the cover glass. The liquid crystal display panel is bonded to the cover glass as being separated from the frame. The filling member fills a space between the lateral surface of the frame and the lateral surface of the liquid crystal display panel and a space between the lateral surface of the frame and the lateral surface of the backlight unit.

According to yet another feature of the present disclosure, the frame is extended from the bottom surface of the cover glass to a lateral surface of the cover glass so as to be bonded to the bottom surface and the lateral surface of the cover glass.

According to still another feature of the present disclosure, a thickness of the filling member may be equal to or greater than a sum of a thickness of the liquid crystal display panel and half of a thickness of the backlight unit.

According to still another feature of the present disclosure, the liquid crystal display device further includes: a supporting panel which accommodates the backlight unit and is in contact with the bottom surface of the liquid crystal display panel. The filling member is in contact with a lateral surface of the supporting panel and a lateral surface of the liquid crystal display panel.

According to still another feature of the present disclosure, the filling member is formed of a resin composition containing carbon black.

According to still another feature of the present disclosure, the carbon black is contained in an amount of at least 1 wt % with respect to the total weight of the resin composition.

According to another aspect of the present disclosure, there is provided a liquid crystal display device including: a liquid crystal display module; a cover glass; and a multifunctional member. The liquid crystal display module includes a liquid crystal display panel and a backlight unit. The cover glass covers an upper part of the liquid crystal display module. A frame is bonded to the cover glass as being separated from a lateral surface of the liquid crystal display module. The multifunctional member is configured to fill a space between the frame and the liquid crystal display module and minimize a light leaked from a space between the backlight unit and the frame.

According to another feature of the present disclosure, the liquid crystal display panel and the backlight unit of the liquid crystal display module are bonded to each other by the multifunctional member in direct contact with a lateral surface of the liquid crystal display panel and a lateral surface of the backlight unit.

According to yet another feature of the present disclosure, the multifunctional member is configured to buffer an impact applied to the frame.

According to yet another feature of the present disclosure, the multifunctional member may be formed of a resin.

According to yet another feature of the present disclosure, the multifunctional member may contain a carbon black.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a liquid crystal display panel;
a backlight unit in direct contact with a bottom surface of the liquid crystal display panel;
a cover glass in contact with a top surface of the liquid crystal display panel;
a frame bonded to the cover glass; and
a filling member disposed between the frame and the liquid crystal display panel and between the frame and the backlight unit,
wherein the filling member is in direct contact with a bottom surface of the cover glass, a lateral surface of the frame, a lateral surface of the liquid crystal display panel, and a lateral surface of the backlight unit, and
wherein the lateral surface of the frame, the lateral surface of the liquid crystal display panel, and the lateral surface of the backlight unit are bonded to each other by the filling member.

2. The liquid crystal display device according to claim 1, wherein the frame is in contact with a bottom surface of the cover glass at an edge of the cover glass,
the liquid crystal display panel is bonded to the cover glass as being separated from the frame, and
the filling member fills a space between the lateral surface of the frame and the lateral surface of the liquid crystal display panel and a space between the lateral surface of the frame and the lateral surface of the backlight unit.

3. The liquid crystal display device according to claim 2, wherein the frame is extended from the bottom surface of the cover glass to a lateral surface of the cover glass so as to be bonded to the bottom surface and the lateral surface of the cover glass.

4. The liquid crystal display device according to claim 2, wherein a thickness of the filling member is equal to or greater than a sum of a thickness of the liquid crystal display panel and half of a thickness of the backlight unit.

5. The liquid crystal display device according to claim 1, further comprising:
a supporting panel which accommodates the backlight unit and is in contact with the bottom surface of the liquid crystal display panel,
wherein the filling member is in contact with a lateral surface of the supporting panel and a lateral surface of the liquid crystal display panel.

6. The liquid crystal display device according to claim 1, wherein the filling member is configured to buffer an impact applied to the frame and formed of a resin composition containing carbon black to minimize a light leaked from a space between the backlight unit and the frame,
wherein the carbon black is contained in an amount of at least 1 wt % with respect to the total weight of the resin composition.

7. A liquid crystal display device, comprising:
a liquid crystal display module including a liquid crystal display panel and a backlight unit;
a cover glass configured to cover an upper part of the liquid crystal display module;
a frame bonded to the cover glass as being separated from a lateral surface of the liquid crystal display module; and
a multifunctional member configured to fill a space between the frame and the liquid crystal display module and disposed between the frame and the liquid crystal display module,
wherein the multifunctional member is in direct contact with a bottom surface of the cover glass, a lateral surface of the frame, and a lateral surface of the liquid crystal display module, and
wherein the lateral surface of the frame and the lateral surface of the liquid crystal display panel are bonded to each other by the multifunctional member.

8. The liquid crystal display device according to claim 7, wherein the liquid crystal display panel and the backlight unit of the liquid crystal display module are bonded to each other by the multifunctional member in direct contact with a lateral surface of the liquid crystal display panel and a lateral surface of the backlight unit.

9. The liquid crystal display device according to claim 7, wherein the multifunctional member is configured to buffer an impact applied to the frame.

10. The liquid crystal display device according to claim 9, wherein the multifunctional member is formed of a resin.

11. The liquid crystal display device according to claim 10, wherein the multifunctional member contains a carbon black to minimize a light leaked from a space between the backlight unit and the frame.

12. An apparatus comprising:
a display structure having elements related to outputting images and a backlight unit;
a support structure along an outer periphery of at least two opposing side edges of the display structure and spaced apart therefrom;
a cover over the display structure and attached directly to the support structure; and
a multifunctional member that fills a space created between corresponding surfaces of the display structure, the support structure and the cover, the multifunctional member having parameters that provide protection from physical impacts while minimizing light leakage,
wherein a lateral surface of the support structure, a lateral surface of the display structure and a lateral surface of the backlight unit are bonded to each other by the multifunctional member.

13. The apparatus of claim 12, wherein the parameters are achieved by the multifunctional member being made of a resin composition that exhibits a cushion-like effect and an additive material in the resin composition that blocks light from leaking from the display structure.

14. The apparatus of claim 13, wherein the resin composition has adhesive characteristics that allow attachment between the corresponding surfaces of the display structure, the support structure and the cover.

15. The apparatus of claim 14, wherein the multifunctional member is in direct contact with a bottom surface of the cover, the lateral surface of the support structure, and the lateral surface of the display structure.

16. The apparatus of claim 15, wherein the additive material is carbon black.

17. The apparatus of claim 16, wherein the carbon black is contained in an amount of at least 1 wt % with respect to the total weight of the resin composition.

18. The apparatus of claim 17, wherein a thickness of the multifunctional member is greater than a thickness of the display structure.

19. The apparatus of claim 18, wherein the display structure supports liquid crystal display (LCD) technology.

\* \* \* \* \*